July 20, 1943.  M. J. KITTLER  2,324,585
TORQUE RESPONSIVE DEVICE
Filed Dec. 2, 1940   2 Sheets-Sheet 1
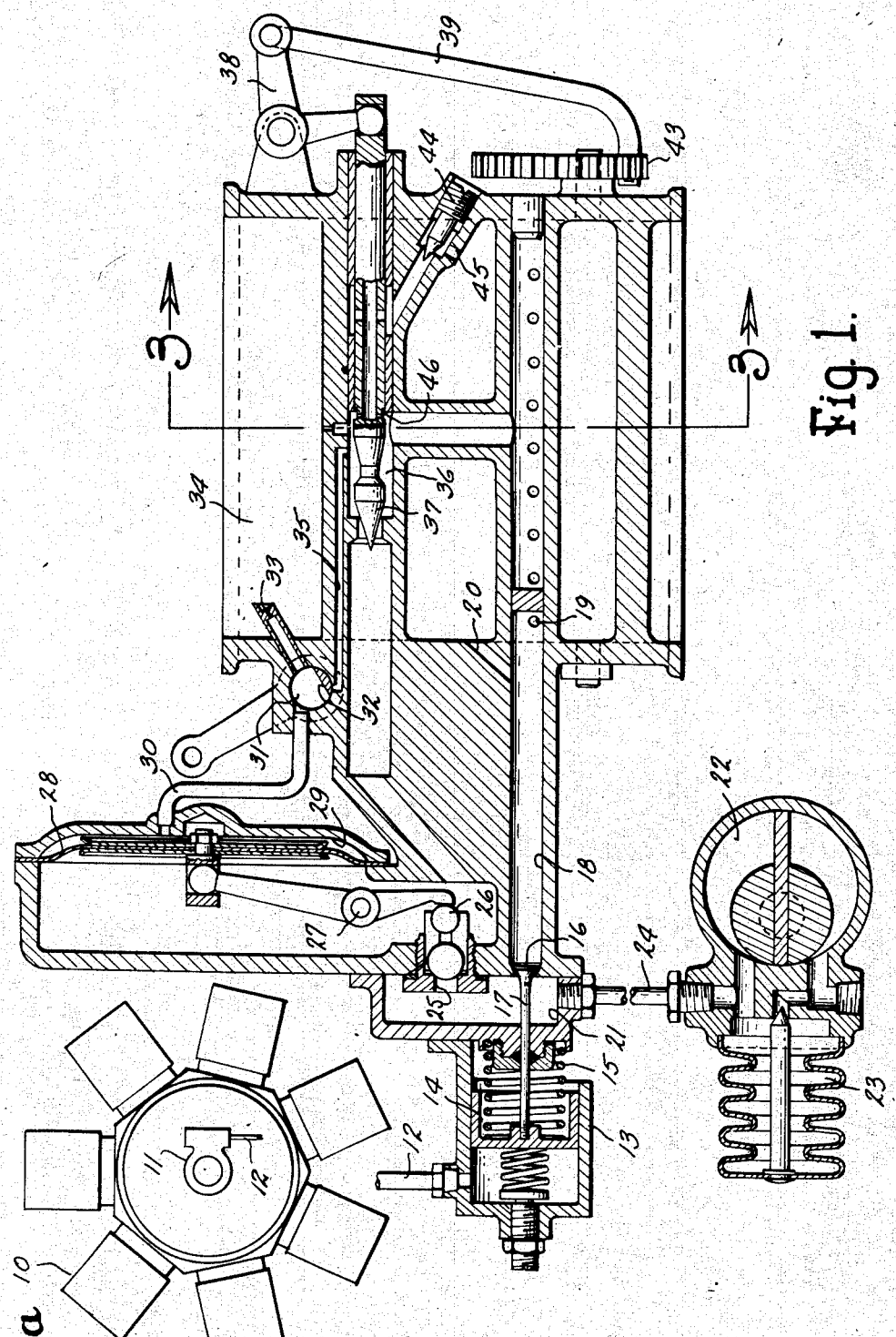
INVENTOR.
Milton J. Kittler
BY
Stanly M Udale

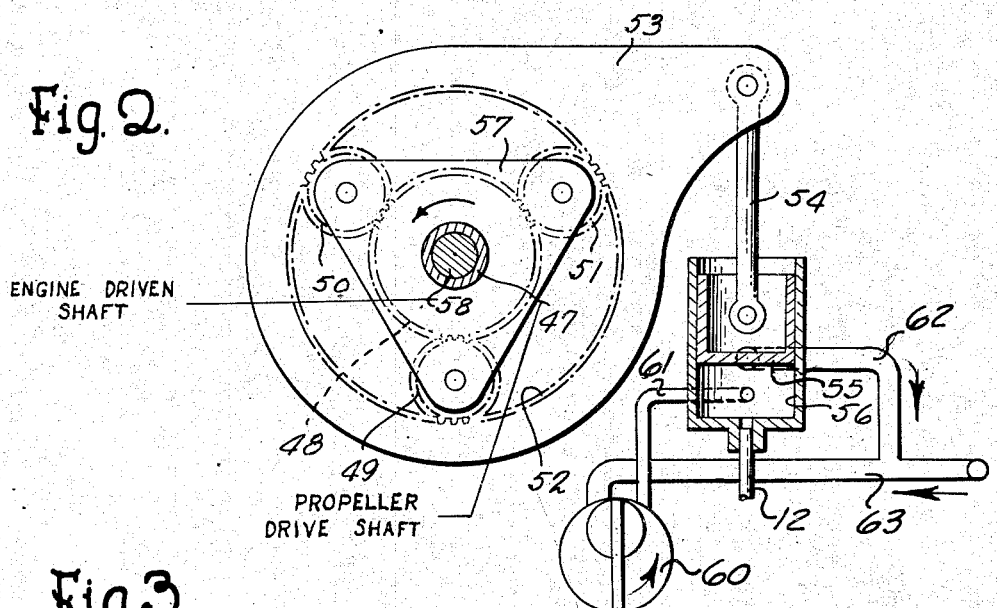
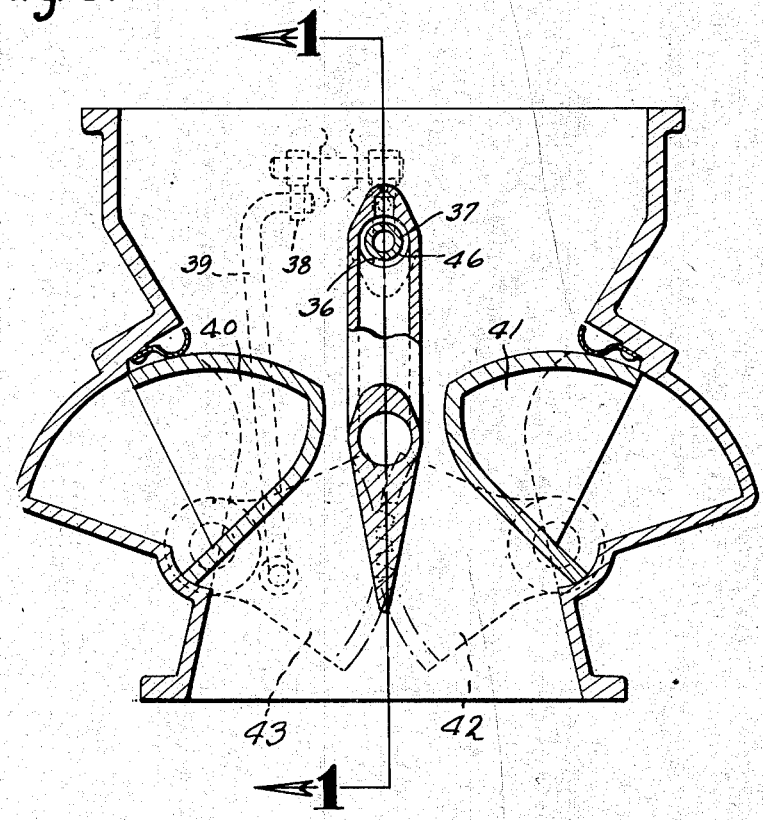

Patented July 20, 1943

2,324,585

UNITED STATES PATENT OFFICE 2,324,585

TORQUE RESPONSIVE DEVICE

Milton J. Kittler, Detroit, Mich., assignor to
George M. Holley and Earl Holley

Application December 2, 1940, Serial No. 368,172

7 Claims. (Cl. 123—119)

The object of this invention is to regulate the ratio of fuel to air in an airplane carburetor. In the ordinary airplane carburetor now in use, it has been customary to increase the flow of fuel and the mixture ratio after the horsepower exceeds 70% of the maximum horsepower. This extra fuel is added for two purposes: (1) in order that the absolute maximum horsepower may be developed during take-off; and (2) to prevent the cylinders overheating, this being especially true when the cylinders are air-cooled as many engine cylinders are.

Recently there has been adopted the constant speed propeller in which case the torque is the variable factor rather than the horsepower, and in this case overheating may take place when the mean effective pressure exceeds 70% of the maximum mean effective pressure. The object of this invention is to control the added fuel by the mean effective pressure rather than by horsepower. Now obviously torque corresponds exactly to mean effective pressure.

Recently there have been adopted torque registering devices which enable the pilot to know the torque that the engine is developing. In the early days it was customary to watch the revolution indicator, but with the constant speed propeller the pilot now watches the torque indicator which tells him whether the engine is wasting power because of friction or ice. Hence it is proposed to utilize one of these torque responsive devices to control the fuel supply.

In the drawings:

Figure 1 shows a torque controlled carburetor partially in section taken on plane I—I of Figure 3.

Figure 1a is a portion of Fig. 2 to reduced scale, showing the airplane engine to which the torque responsive device is attached.

Figure 2 shows the detail of the torque indicating device which is to be made large enough to operate control mechanism.

Figure 3 shows a cross sectional elevation through the center of the carburetor shown in Figure 1.

In Figures 1 and 1a, 10 indicates diagrammatically the engine; 11 indicates the torque indicating device shown in greater detail in Figure 2, and made sufficiently powerful to operate the fuel control device. 12 indicates the pipe connecting the torque indicating device 11 with the cylinder 13, in which there reciprocates the piston 14 compressing a spring 15. A valve seat 16 limits the left hand motion of the piston 14. This valve seat is connected by a tapered rod 17 to the piston 14, so that when the piston 14 moves to the right and compresses the spring 15 due to the increase of torque in the torque responsive device 11, the tapered portion 17 meters the fuel flowing into the passage 18 which discharges into the mixing chamber through the opening 19, and is designed so as to prevent hunting. Air enters at 20 to mix with the fuel flowing through the pipe 18.

The fuel which flows to the chamber 21 comes from the pump 22, and the pressure in this pump is regulated by an automatic device 23 controlled by variations in atmospheric pressure. The fuel thus flows under constant pressure through a pipe 24 to the chamber 21. The normal fuel supply is no part of this invention and is shown diagrammatically. The fuel entrance 25 is controlled by the valve 26 which is under the control of the lever 27 which is operated by the diaphragm 28, which diaphragm forms the left hand wall of the air chamber 29. This is connected by means of the pipe 30 to the valve chamber 31 in which a valve 32 rotates, and regulates the relative effect of a restricted opening 33, which is located in the air entrance 34, and a restricted passage 35 which is connected to a fuel and air chamber 36 in which reciprocates the needle valve 37. This needle valve 37 is controlled by the bell crank lever 38. The link 39 and the needle 37 are moved in unison with the throttles 40 and 41 (shown in Figure 3), which are geared together by means of the gears 42 and 43.

The air for the low speed is regulated by the needle valve 44, which obtains its air through the opening 45 from the air entrance 34. This air flows through the center of the hollow needle valve 37 to an opening 46, which opening 46 is only in communication with the chamber 36 when the needle valve is closed and in the idling position. This opening 46 is disconnected from the chamber 36 when the throttles are moved away from the idling position, and the needle 37 moves to the right. This portion of the carburetor is no part of this invention, the invention being the addition of a torque responsive device to regulate the addition of the extra fuel by way of valve 17.

Figure 2 shows the details of the torque responsive device which is a commercial article, and consists of the hollow shaft 47 mounted on the plate 57, which carries the three small gears 49, 50, 51. These engage with the gear 48 mounted on the shaft 58. The small gears 49, 50, 51 also engage with the annular outer stationary internal gear 52 mounted on the plate 53 connected through the rod 54 to the piston 55 which slides in the cylinder 56 and creates a pressure in the tube 12 corresponding to the torque.

The engine drive is through a solid shaft 58 which is integral with and connected to the spur wheel 48, which engages with and drives the small spur gears 49, 50 and 51. These small spur gears are mounted on the triangular plate 57, and engage with the internal gear 52. A propeller is connected to the hollow shaft 47 which is connected to the triangular plate 57. Now if the propeller be held still, the triangular plate 57 will be held still. Therefore, as the spur gear 48 is rotated anti-clockwise, the small gear wheels 49, 50 and 51 would rotate clockwise carrying with them in a clockwise direction the torque arm 53.

In order to take care of leakage, a small oil pump 60 supplies oil under pressure through a pipe 61. When the pressure in the cylinder 56 increases, the piston 55 rises and allows oil to return through the pipe 62 to the oil inlet pipe 63. By making the pipe 62 large and restricting the pipe 61 slightly, the pressure in the chamber 56 corresponds to the torque, and is not influenced by the oil pump.

*Operation*

In the normal operation of the engine, assuming that the oil pump 60 is operating at a speed proportional to the engine speed, oil pressure is generated in the pump and delivered through the pipe 61 to the chamber 56. The piston 55 rises and uncovers the relatively large port leading to the pipe 62, permitting oil to flow back to the pipe 63 and thus return to the oil pump 60. Hence the system is maintained full of oil at all times, when the oil pressure is below that corresponding to 70%. The spring 15 is sufficiently stiff to maintain the valve 16 seated and the carburetor operates in the normal manner. When the torque exceeds 70% the piston 14 moves to the right and uncovers the opening in which the valve 16 seats. As the torque increases, the quantity of fuel flowing past the tapered stem 17 of the valve 16 also increases. Pressure in 18 corresponds to that of the atmosphere by reason of the opening 20. Gasoline therefore flows along the pipe 18, discharges through the opening 19 into the throat of the variable venturi between the throttle valve sections 40, as in Fig. 3 in a well known manner. The flow along 18 is uninfluenced by the suction in the throat of the variable venturi. Additional fuel will be admitted to the pipe 18 as long as this added fuel causes an increase of torque. This device, therefore, will automatically deliver a mixture which corresponds to maximum torque.

What I claim is:

1. In an internal combustion engine provided with torque responsive means, external carburetion means comprising a source of fuel supply under a substantially constant pressure, a fuel supply chamber connected thereto, a pressure reducing valve therefor adapted to maintain a relatively low pressure of constant value in said chamber, a fuel outlet passage from said chamber adapted to discharge into said carburetor, a second fuel passage connecting the high pressure fuel directly to the carburetor, a second fuel valve in said passage, and means responsive to said engine torque responsive means for opening said second valve when the troque exceeds a predetermined minimum value.

2. In an internal combustion engine having a torque responsive device, the combination with a throttle controlled air inlet of two fuel nozzles having restricted orifices arranged to discharge into said inlet adjacent to said throttle, a mechanically operated fuel pump for supplying liquid fuel to said nozzles, means controlled by the throttle for varying the area of the discharge orifice of one of said nozzles, and means actuated by said torque responsive means for controlling the area of the other orifice.

3. Fuel control means for an internal combustion engine having torque responsive means, and a carburetor comprising a source of fuel having a substantially constant pressure, a fuel nozzle leading to said carburetor, a second fuel passage, a regulating valve in said second passage, and means responsive to said torque responsive means for opening said valve after the torque has exceeded 70% of the maximum torque.

4. Fuel control means for an internal combustion engine having torque responsive means comprising a source of fuel under a substantially constant pressure, means for admitting fuel and air to said engine, said means being adapted to maintain the fuel and air ratios substantially constant, additional fuel admission means from said constant pressure source, said additional fuel means being responsive to said torque responsive means and being inoperative when the torque is less than 70% of the maximum torque.

5. In an internal combustion engine having torque responsive means, a carburetor having a mixing chamber of Venturi form, a fuel nozzle discharging therein, a source of fuel supply connected thereto, a second fuel nozzle discharging into the mixture chamber, a valve controlling the flow to said second nozzle, and means responsive to said torque responsive means for opening said valve when the torque exceeds a predetermined minimum value and for moving said valve into position at which the engine automatically delivers maximum torque.

6. An internal combustion engine having a torque responsive means, a carburetor, a mixing chamber, a fuel nozzle discharging therein, a source of fuel supply connected thereto, a second fuel nozzle also connected to said source of fuel supply, a valve controlling the flow to the second nozzle, and means responsive to said torque responsive means for opening said valve when the torque exceeds a predetermined minimum value.

7. An internal combustion engine, a torque responsive means, a carburetor, a mixing chamber, a fuel nozzle discharging therein under the influence of the suction in said carburetor, a source of fuel under pressure, a second fuel nozzle connected thereto, a valve controlling the flow to said second nozzle, and means responsive to said torque responsive means for operating said valve when the torque exceeds a predetermined minimum value.

MILTON J. KITTLER.